(12) United States Patent
Fujita

(10) Patent No.: US 7,090,300 B2
(45) Date of Patent: Aug. 15, 2006

(54) LOW FREQUENCY VIBRATION STRUCTURE AND LOW FREQUENCY VIBRATION SEAT

(75) Inventor: Etsunori Fujita, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/871,674

(22) Filed: Jun. 18, 2004

(65) Prior Publication Data

US 2004/0256905 A1  Dec. 23, 2004

(30) Foreign Application Priority Data

Jun. 20, 2003  (JP) .............................. 2003-177377

(51) Int. Cl.
 *A47C 7/02*  (2006.01)
(52) U.S. Cl. ............................ 297/452.49; 297/452.51; 297/452.56
(58) Field of Classification Search ........... 297/452.49, 297/452.51, 452.52, 452.53, 452.56, 452.57
See application file for complete search history.

(56) References Cited

U.S. PATENT DOCUMENTS

| | | | | |
|---|---|---|---|---|
| 3,589,763 A | * | 6/1971 | Reeves .................. | 297/452.56 |
| 5,368,368 A | * | 11/1994 | Fukui et al. ............ | 297/452.18 |
| 5,490,718 A | * | 2/1996 | Akizuki et al. ......... | 297/452.49 |
| 5,624,161 A | * | 4/1997 | Sorimachi et al. ...... | 297/452.52 |
| 6,676,218 B1 | * | 1/2004 | Fujita et al. ............ | 297/452.49 |
| 6,773,069 B1 | * | 8/2004 | Kaneko et al. ......... | 297/344.17 |
| 6,793,289 B1 | * | 9/2004 | Kuster et al. ........... | 297/452.52 |
| 6,854,805 B1 | * | 2/2005 | Fujita et al. ............ | 297/452.56 |
| 6,921,132 B1 | * | 7/2005 | Fujita et al. ............ | 297/216.13 |

* cited by examiner

*Primary Examiner*—Laurie K. Cranmer
(74) *Attorney, Agent, or Firm*—Wolf Block Schorr & Solis-Cohen LLP

(57) ABSTRACT

The structure is formed by serially connecting a torsion bar and a coil spring via a arm and a supporting frame to thereby elastically support a flat-type supporting member, and by disposing a cushioning member for seat cushion provided with a spring characteristic closely analogous to a load-to-deflection characteristic (spring characteristic) of the muscle of a human body above the flat-type supporting member. Accordingly, it is possible to make a spring characteristic for working when supporting a load of a human different from a spring characteristic for working when removing vibration even with an extremely simple structure. In other words, the structure has an excellent function to make the spring constant at work when removing vibration, especially when removing a high frequency component.

6 Claims, 15 Drawing Sheets

F I G. 3
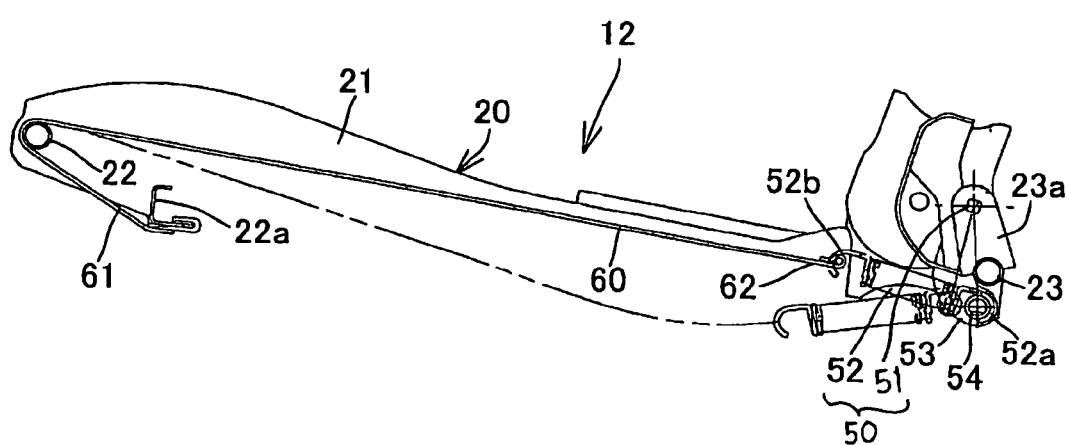

F I G. 1 1 A
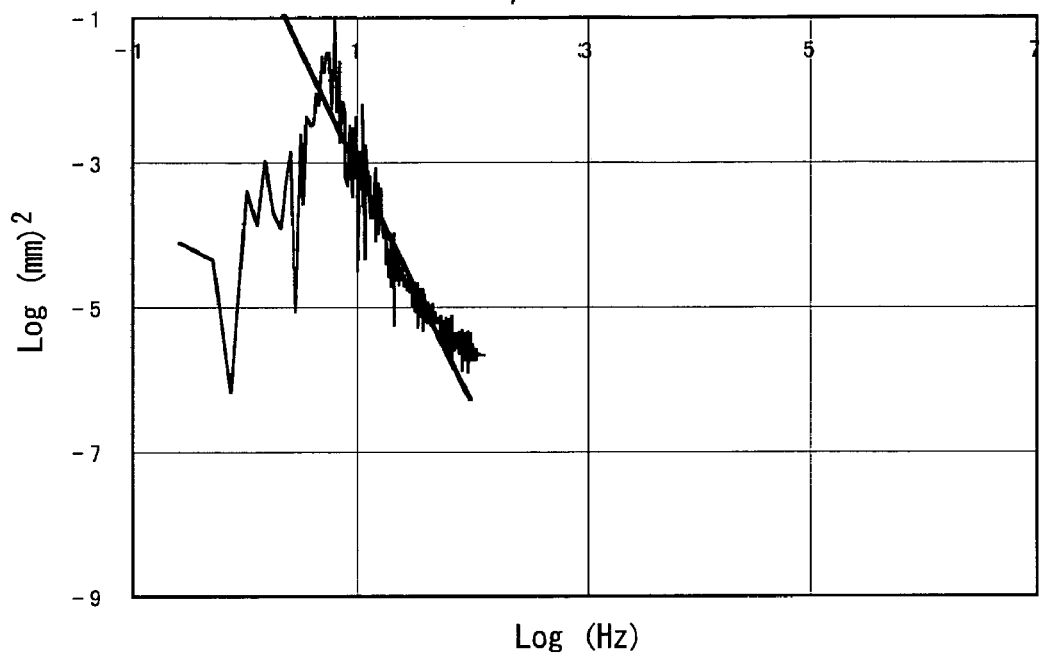
F I G. 1 1 B
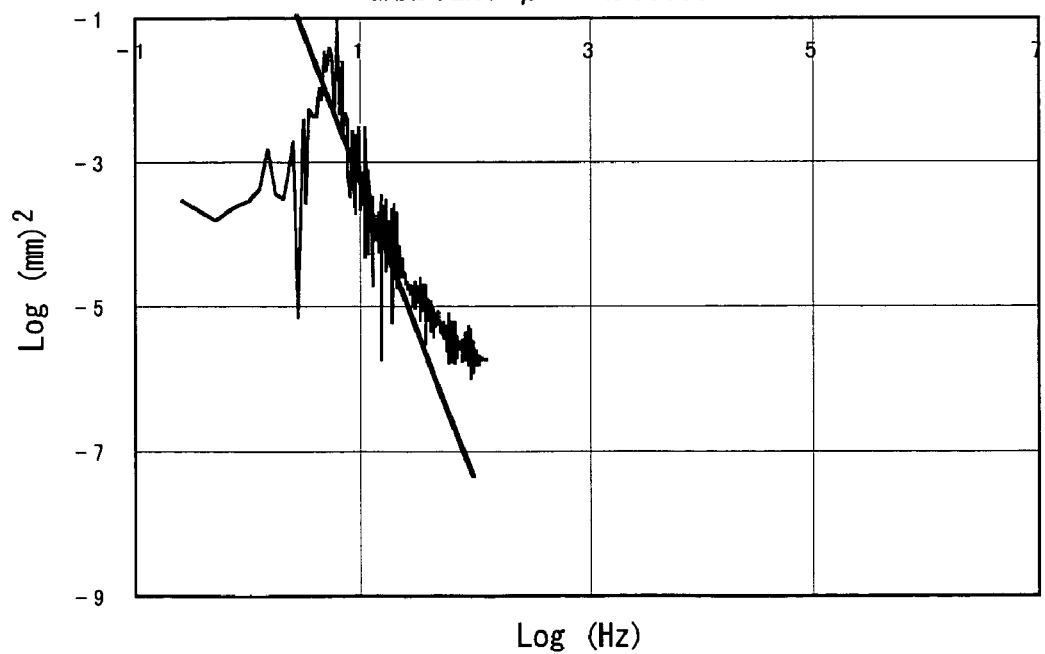

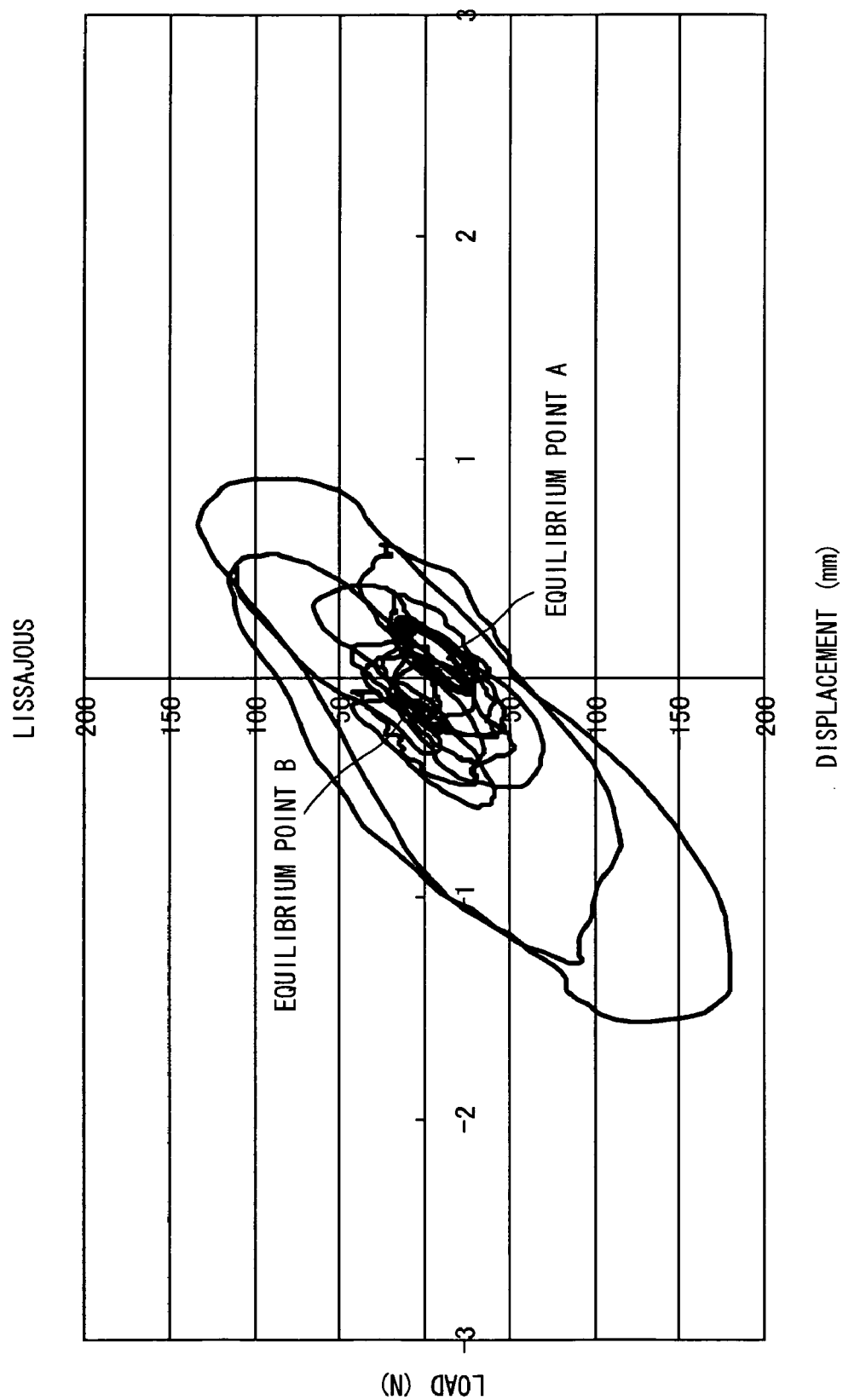

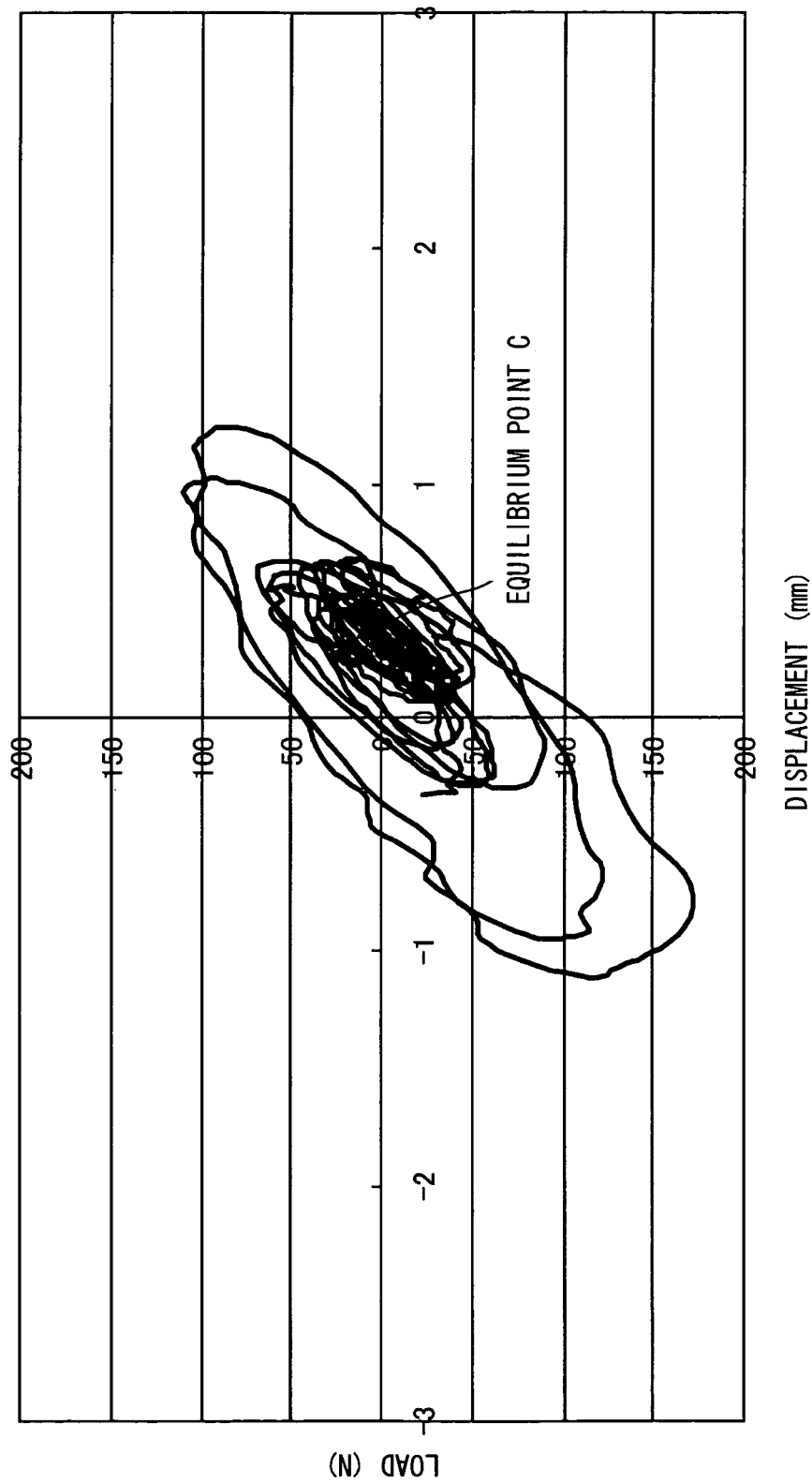

LOW FREQUENCY VIBRATION STRUCTURE AND LOW FREQUENCY VIBRATION SEAT

FIELD OF THE INVENTION

The present invention relates to a low frequency vibration structure, which can generate a low frequency vibration to a cushioning member disposed at a contacting portion with a human body, and is applicable to a seat structure for transportation vehicles such as an airplane, train, ship, forklift, automobile, and the like, a seat structure for home use, office use, or for bedding. The present invention also relates to a low frequency vibration seat using the low frequency vibration structure.

BACKGROUND OF THE INVENTION

A seat used for an airplane, train, ship, automobile or the like is always requested to be improved not only in its fundamental function such as impact absorbency, vibration absorbency, and the like, but also in various functions such as physique difference absorbency, posture difference absorbency, body movement smoothness to assist the above-described functions and to obtain more pleasant riding comfort. Further, in recent years, in order to reduce the weight of transportation machine such as an automobile and the like from the viewpoint of environmental measures by improving fuel efficiency, a seat used for these transportation machine is also required to reduce its weight in addition to improve the above-described various functions, and technique for using a thinner cushioning member lighter in weight and so on has been proposed.

From the above-described viewpoint, for instance, the present applicant proposes a three-dimensional solid knitted fabric having light weight but characteristics (spring characteristic and damping characteristic) sufficient as a cushioning member for a seat structure by straining a solid knitted fabric having several millimeters to several tens of millimeters in thickness over frames to use as a tension structure (refer to Patent Document 1: Japanese Patent Application Laid-open No. 2002-339206). The three-dimensional solid knitted fabric disclosed in Patent Document 1 is a solid knitted fabric set with two or more portions different in compression rate, and by using the solid knitted fabric strained over a cushion frame or a back frame in order to use as a tension structure, a spring characteristic similar to the spring characteristic of the muscle of human haunches or the like can be exhibited. As a result, it becomes possible to prevent deformation of the muscle of haunches or the like at the time when a person takes a seat, to lower a counter force from a cushioning member to a person, and to reduce the bloodstream trouble or a muscle load.

In other words, the cushioning member provided with such characteristics can be said to function as a portion of a pseudo-muscle layer, but in order to provide the cushioning member with such functions, it is necessary to strain the cushioning member over the cushion frame or the back frame with a low elongation percentage, preferably in the range of 0 to 5%. Accordingly, when a cushioning member is used individually to a cushion frame, it lacks a feeling of stroke and is apt to give a feeling of bottom touch at the time of being seated. Further, it is necessary to take measures to absorb vibration coming from a vehicle body floor. As a structure for this purpose, the present applicant proposes a seat structure in which a flat-type supporting member made of Plumaflex, cloth spring, or the like disposed under a cushioning member to be mounted on the seat cushion is elastically arranged to a side frame of the cushion frame via a coil spring, as disclosed in Patent Document 2 (Japanese Patent Application Laid-open 2002-177099). This structure exhibits a high vibration absorbing characteristic by movement of the flat-type supporting member and the coil spring. However, as described above, a seat for transportation machine is always requested to be improved in vibration absorbing characteristic and the like.

OBJECTS AND SUMMARY OF THE INVENTION

The present invention has been made in view of the above problem, and an object of the present invention is to provide a low frequency vibration seat applying a low frequency vibration structure to be able to further improve vibration absorbing characteristic and the like so that a further improved seating comfort (riding comfort) can be obtained. Further, another object of the present invention is to provide a low frequency vibration structure possible to enhance comfortability of a user who comes in contact with the cushioning member, for instance, when the present invention is applied to a bedding as well as to a seat structure, a sleep inducing effect can be prompted by low frequency vibration.

In order to solve the above-described problems, the present inventor thought out concerning seat structure that as a spring mechanism to supportedly connect a flat-type supporting member to a cushion frame, a spring member is disposed to take charge of mainly the load of a seated person during the time from being seated to reaching a statically equilibrium state, and for absorbing vibration from the floor of a vehicle body, other spring members are used to work together with the above-described spring member. The present inventor paid attention to a structure to make a spring constant of the whole spring mechanism (composite spring constant) smaller than the spring constant of each spring member individually. That is, the present inventor paid attention to a structure to make the spring constant variable according to a load condition. By making the spring constant of the whole spring mechanism smaller than the spring constant of individual spring member, more preferably, by taking a structure similar to a spring constant of value 0 (zero) as much as possible, especially the transmission rate of a high frequency component in the vibration coming from the floor of the vehicle body to a seated person is reduced.

As a result, since a low frequency component becomes relatively large in the vibration transmitted to the cushioning member, by using a member provided with a load-to-deflection characteristic similar to the muscle of a human body, in other words, a member provided with a so-called pseudo-muscle characteristic as a cushioning member, it becomes possible to make the pressure on the blood vessel or on the nerves small and, at the same time, to excite the cushioning member at a low frequency. When the cushioning member to be said as a pseudo-muscle is thus excited at a low frequency, the bloodstream in the subcutaneous vein positioned between the cushioning member (pseudo-muscle) and the actual muscle of a human is promoted as if being massaged at a low frequency via the muscle (pseudo-muscle), whereby peripheral circulation can be kept favorably so that a seated person is given a pleasant seating comfort (riding comfort). It should be noted that as is clear from the test result to be described later, when the spring constant (composite spring constant) k of the whole spring mechanism is set in the range of 0<k≦20 N/mm, preferably to a value as close as 0, it is found that when a predetermined vibration is inputted from the floor of a vehicle body, an excitation showing a tendency similar to a fluctuation of a human body (hereinafter referred to as "1/f fluctuation excitation") such as 1/f fluctuation, namely heartbeat fluctuation or the like is generated on a contacting surface of the cushioning member with a human body by a combination with a cushioning member provided with the pseudo-muscle characteristic. Accordingly, by making such a structure, 1/f fluctuation excitation generated on the contacting surface of the cushioning member with a human body resonates with a fluctuation of a human body to enhance a function of the peripheral circulation system and help abdominal breathing or pulmonary breathing. Further, a movement takes place at the intervertebral disk of the spine, supply of nutrition and discharge of body waste are performed so that deterioration of performance of the intervertebral disk is reduced and further improvement of seating comfort (riding comfort) can be realized.

The present invention is accomplished based on the above-described knowledge and as is clear from the above explanation, in order to enhance comfortability by resonating with a fluctuation of a human body, it is sufficient to be able to make low frequency vibration, preferably 1/f fluctuation excitation arise to a cushioning member contacting with a human body. Therefore, the present inventor pays attention to a structure also which can make a low frequency vibration arise without applying vibration coming from the floor of a car body. That is, in the above-described explanation, a low frequency vibration is allowed to arise by applying the vibration coming from the floor of a car body owing to use a mechanism to cut a high frequency component. However, even when vibration is not inputted from the floor of a car body, a low frequency vibration can be allowed to arise to the cushioning member by providing with a mechanism to impart low frequency vibration positively to the cushioning member. Through this, it becomes possible to provide a structure to enhance comfortability of the user, without limiting to a seat structure for transportation machine, but for other usages such as a seat structure for home use and office use or for bedding.

That is, the present invention described in claim 1 provides a low frequency vibration structure, which comprises:

a cushioning member to be disposed at a contacting portion with a human body; and a vibration control section to allow a low frequency vibration to arise on the cushioning member, wherein the vibration control section is structured to be provided with a spring mechanism in which a spring constant k is set in the range of 0<k≦20 N/mm in at least a predetermined displacement range.

The present invention described in claim 2 provides the low frequency vibration structure according to claim 1, in which a load-to-deflection characteristic in a substantially perpendicular direction of the cushioning member is similar to a load-to-deflection characteristic of the muscle of a human body.

The present invention described in claim 3 provides the low frequency vibration structure according to claim 1, in which a spring mechanism forming the vibration control section is formed by serially connecting spring members different in spring constant.

The present invention described in claim 4 provides the low frequency vibration structure according to claim 1, in which the spring mechanism forming the vibration control section is composed of a combination of a magnetic spring having a load-to-deflection characteristic in which the load value decreases with increase of the amount of displacement in at least a predetermined displacement range, and an elastic member having a load-to-deflection characteristic in which the load value increases with increase of the amount of displacement in the predetermined displacement range.

The present invention described in claim 5 provides the low frequency vibration structure according to claim 1, in which the vibration control section includes a spring mechanism formed by serially connecting spring members different in spring constant; and the other spring mechanism composed of a combination of a magnetic spring having a load-to-deflection characteristic in which the load value decreases with increase of the amount of displacement in at least a predetermined displacement range, and an elastic member having a load-to-deflection characteristic in which the load value increases with increase of the amount of displacement in the predetermined displacement range, in which the above-described spring mechanism is supported by a supporting section disposed on the other spring mechanism.

The present invention described in claim 6 provides the low frequency vibration structure according to claim 1, in which the vibration control section further includes a vibrator for vibrating either of the above-described spring mechanisms at low frequency, and the spring mechanism is supportedly connected to the vibrator.

The present invention described in claim 7 provides a low frequency vibration seat, which comprises:

a cushioning member disposed at a contacting portion with a human body;

a vibration control section formed with a spring mechanism, of which spring constant k is set to be 0<k≦20 N/mm in at least a predetermined displacement range to make a low frequency vibration arise in the cushioning member; and a flat-type supporting member, connected to the spring mechanism at the rear end thereof, and supported to a frame member positioned in front of the cushion frame at the front end thereof, and biased or urged backwards by the spring mechanism in an ordinary state, and disposed under the cushioning member.

The present invention described in claim 8 provides the low frequency vibration seat according to claim 7, in which the spring mechanism forming the vibration control section is formed by serially connecting spring members, different in spring constant, and disposed in the rear of the seat cushion;

among the spring members forming the spring mechanism, a spring member relatively low in spring constant mainly works until a statically equilibrium state is obtained after a person takes a seat on the cushioning member; and when vibration is inputted, a plurality of spring members connected in series work together to function those composite spring constant which is further lower value than that of the above-described spring member relatively low in spring constant, the composite spring constant has a value in the range of 0<k≦20 N/mm in at least a predetermined displacement range.

The present invention described in claim 9 provides the low frequency vibration seat according to claim 8, in which the spring mechanism includes a first spring member connected to either frame member forming a cushion frame or a back frame positioned in the rear of the seat cushion at one end; and a second spring member connected to the first spring member directly or indirectly at one end, and connected to the rear end of the flat-type supporting member at the other end, the first spring member has a relatively lower spring constant than that of the second spring member.

The present invention described in claim 10 provides the low frequency vibration seat according to claim 9, in which the first spring member is composed of a torsion bar connected to the frame member at one end and disposed along the width direction of the seat cushion, the second spring member is composed of a plurality of coil springs, the respective coil springs are connected at each one end in parallel to a supporting frame supportedly connected to an arm which is connected to the torsion bar at the base end portion and biased or urged backwards at a normal state, and disposed along the width direction of the seat cushion.

The present invention described in claim 11 provides the low frequency vibration seat according to claim 7, in which the cushioning member includes a spring constant calculated from the load-to-deflection characteristic when pressurized up to 100N with a pressure board of 98 mm in diameter is 1.5 to 3.5 N/mm at a weight applying process, 1 to 3 N/mm at a weight removing process, and the amount of hysteresis loss between the weight applying process and the weight removing process is in a range of 10 to 30 N at the maximum.

The present invention described in claim 12 provides the low frequency vibration seat according to claim 7, in which the cushioning member is disposed as a tension structure strained over the cushion frame at the elongation percentage in the range of 0 to 5%.

The present invention described in claim 13 provides the low frequency vibration seat according to claim 7, in which the cushioning member is formed with a solid knitted fabric.

The present invention described in claim 14 provides the low frequency vibration seat according to claim 8, in which the vibration control section includes in addition to the spring mechanism formed by serially connecting spring members different in spring constant, and disposed in the rear of the seat cushion, other spring mechanism composed of a combination of a magnetic spring having a load-to-deflection characteristic in which the load value decreases with increase of the amount of displacement in at least a predetermined displacement range, and an elastic member having a load-to-deflection characteristic in which the load value increases with increase of the amount of displacement in the predetermined displacement range, the other spring mechanism supports the seat cushion having the spring mechanism formed by serially connecting spring members different in spring constant to its supporting portion, so as to be used as a seat suspension.

The present invention described in claim 15 provides the low frequency vibration seat according to claims 7, in which the vibration control section further includes a vibrator for vibrating either of the above-described spring mechanisms at a low frequency, and the spring mechanism is supportedly connected to the vibrator.

BRIEF DESCRIPTION OF THE DRAWINGS

The foregoing and still other objects and advantages of the present invention will be more apparent from the following detailed explanation of the preferred embodiments of the invention in connection with the accompanying drawings.

FIG. 3 is a cross-sectional view taken along the line A—A in FIG. 1;

FIG. 11A and FIG. 11B are views analyzing whether 1/f fluctuation is generated in a seat in comparison 1;

FIG. 12 is a Lissajous figure for a relationship between load and relative displacement in a vibration experiment (test example 3) performed to the seat in example 1;

FIG. 13 is a Lissajous figure for a relationship between load and relative displacement in a vibration experiment (test example 3) performed to the seat in comparison 1;

DETAILED DESCRIPTION OF THE INVENTION

Figure 1:
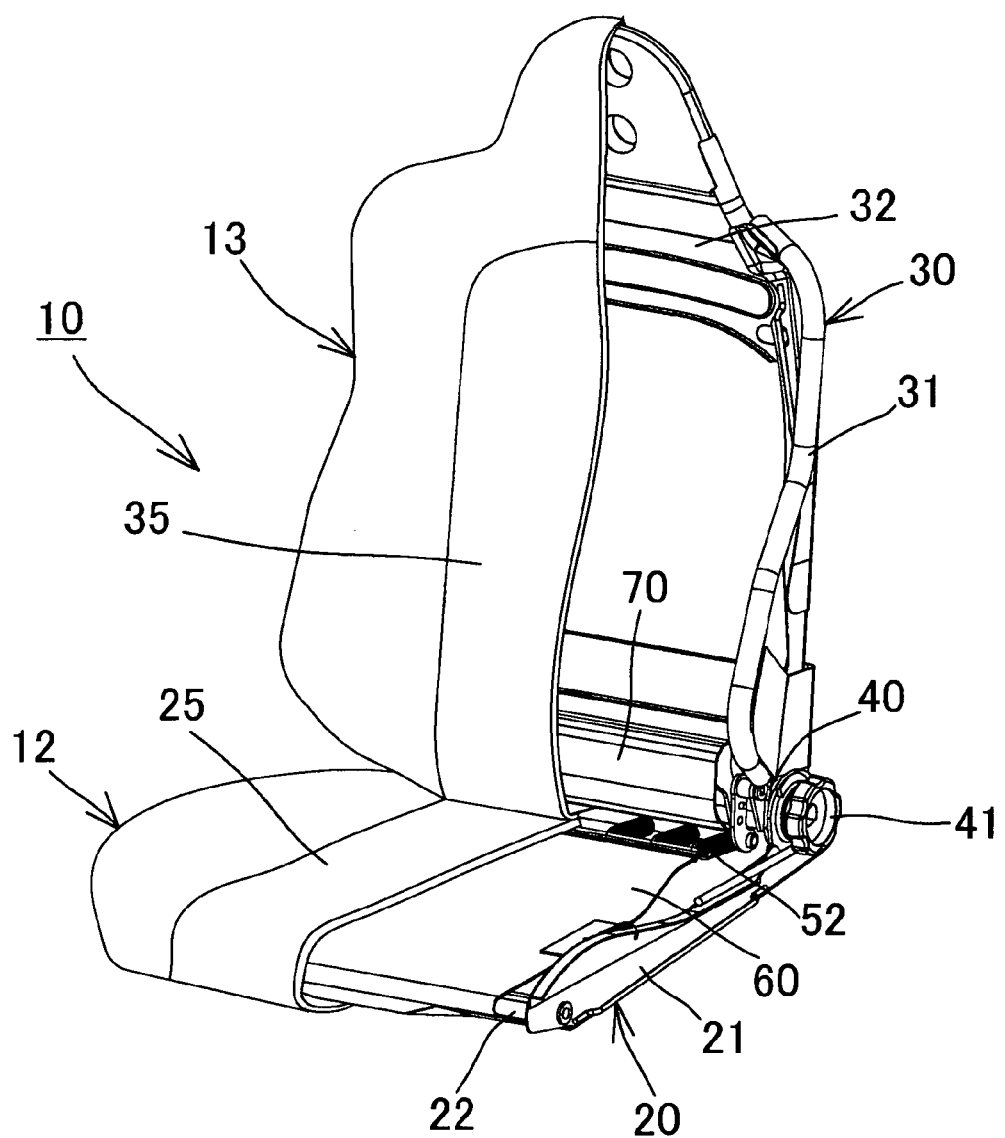
FIG. 1 is a diagrammatic perspective view showing a low frequency vibration seat relating to one embodiment of the present invention.

Hereinafter the present invention will be explained in more detail based on embodiments shown in the drawings. FIG. 1 to FIG. 4 are views showing a principal portion of a low frequency vibration seat 10 relating to one embodiment of the present invention. In the present embodiment, the low frequency vibration seat 10 suitable for using as a seat structure of a transportation machine such as an automobile and the like. As shown in these drawings, the low frequency vibration seat 10 is composed of a seat cushion 12 and a seat back 13. The seat cushion 12 includes a cushion frame 20 and a cushioning member 25 disposed by straining over the cushion frame 20, and the seat back 13 includes a back frame 30 and a cushioning member 35 disposed by straining over the back frame 30.

Figure 2:
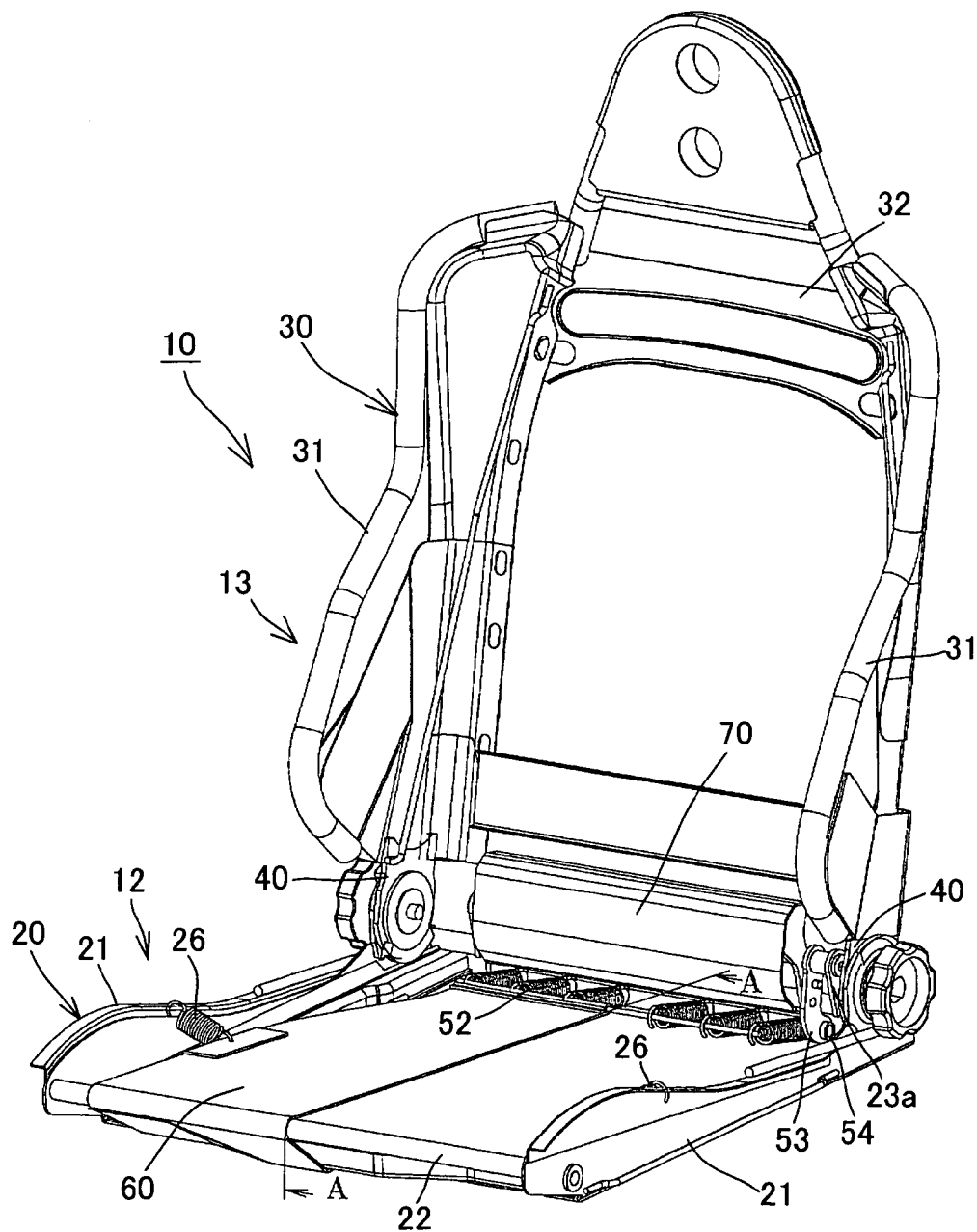
FIG. 2 is a perspective view showing a cushion frame and a back frame of the low frequency vibration seat relating to the above-described embodiment.

In more detail, as shown in FIG. 2 and FIG. 3, the cushion frame 20 is composed of a pair of side frame members 21 and 21 disposed with a gap across the width, a front frame member 22 positioned in front of the seat cushion 12, and a rear frame member 23 positioned in the rear of the seat cushion 12. The back frame 30 is composed of a pair of side frame members 31 and 31 disposed with a gap across the width, and an upper frame member 32, as shown in FIG. 1 and FIG. 2. Respective rear end portions of the side frame members 21 and 21 forming the cushion frame 20 and respective lower end portions of the side frame members 31 and 31 forming the back frame 30 are connected to each other via a bracket 40 and a reclining adjuster 41.

Figure 4:
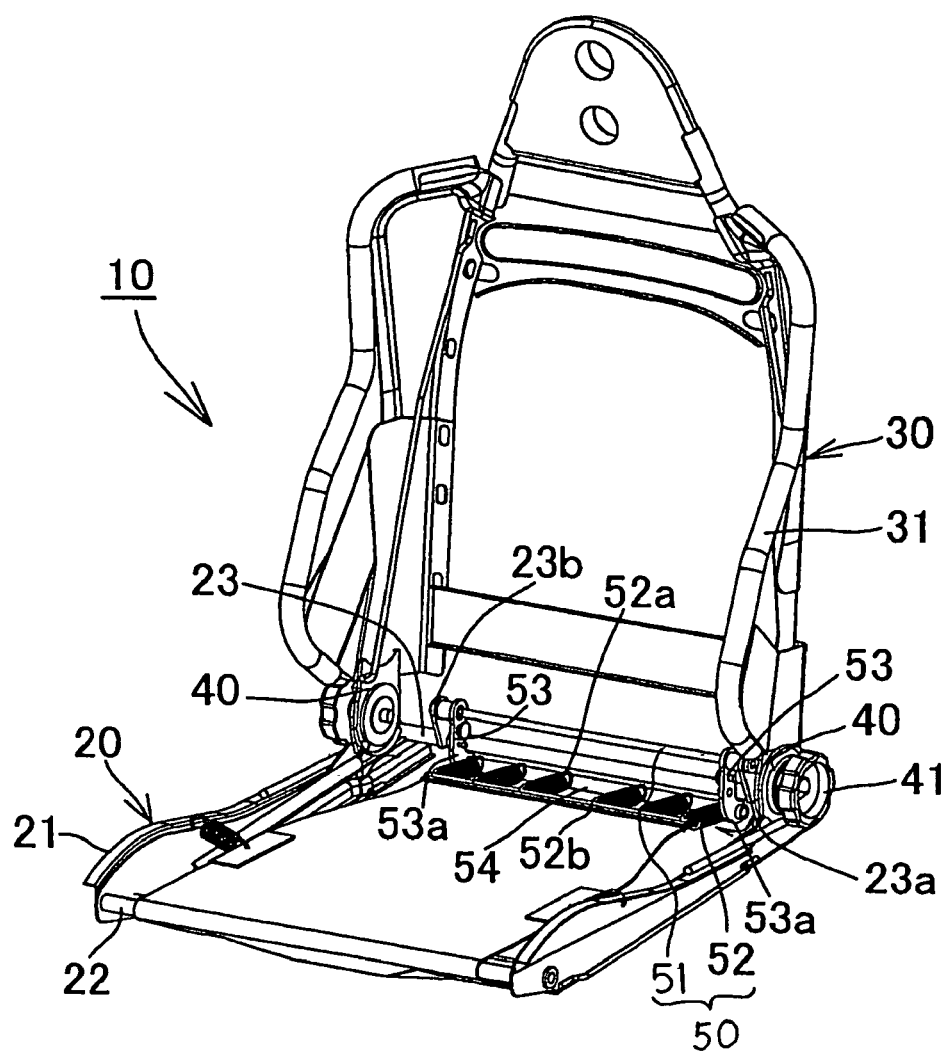
FIG. 4 is a view eliminating a pelvis supporting member shown in FIG. 2 to show a detail of the spring mechanism used in the above-described embodiment.

A spring mechanism 50 forming a vibration control section to generate low frequency vibration in the present embodiment is disposed in the rear of the seat cushion 12 (refer to FIG. 4). The spring mechanism 50 is formed by serially connecting a plurality of spring members, and in the present embodiment, a torsion bar 51 is used as a first spring member and a coil spring 52 is used as a second spring member. The torsion bar 51 which is the first spring member is supported between brackets 23*a* and 23*b* for the torsion bar protruding with a predetermined interval on the rear frame member 23 positioned in the rear of the seat cushion 12, and arranged along the width of the seat cushion 12. The torsion bar 51 is fixed at its one end (a fixed end ) to one bracket 23*a* for the torsion bar, and is rotatably supported at the other end (a movable end) by the other bracket 23*b* for the torsion bar. The torsion bar 51 exhibits a predetermined spring characteristic by being twisted at the movable end side.

Arms 53 are provided in the vicinities of respective ends of the torsion bar 51. One arm 53 arranged on the fixed end side of the torsion bar 51 is pivotably disposed to the torsion bar 51 at its base end portion, and the other arm 53 arranged on the movable end side of the torsion bar 51 is directly connected to the torsion bar 51 at its base end portion, and biased to tilt backwards (refer to FIG. 4) by its twist torque. The arm 53 is provided to connect to the torsion bar 51 at its base end portion so as to protrude downwards as shown in FIG. 2 to FIG. 4, and a supporting frame 54 is disposed along the width direction of the seat cushion 12 between the lower end portions 53*a* of respective arms 53. As a result, as shown in FIG. 4, it is structured that the lower end side of the arm 53 and the supporting frame 54 pivot forth and back with the torsion bar 51 positioned on the upper side as an axis.

The coil spring 52 which is the second spring member is engaged with the above-described supporting frame 54 at one end 52*a*, and the other end 52*b* is engaged with a rear end 62 of a flat-type supporting member 60 which will be described later. As shown in FIG. 2, the coil spring 52 is disposed in parallel in a plurality of number along the width of the seat cushion 12, and each coil spring 52 is put over between the supporting frame 54 and the rear end portion 62 of the flat-type supporting member 60. Accordingly, the above-described torsion bar 51 being the first spring member and the coil spring 52 being the second spring member are to be connected in series via the arm 53 and the supporting frame 54.

The flat-type supporting member 60 is disposed in connection with the spring mechanism 50 to prevent a feeling of bottom touch when a person takes a seat on the cushioning member 25 disposed above, to make up a feeling of stroke, and to make a predetermined vibration absorbing characteristic work. More specifically, a front edge portion 61 is provided by being engaged with an auxiliary frame member 22*a* placed under the front frame member 22 positioned in front of the cushion frame 20, and a rear edge portion 62 is provided by being engaged with the other end 52*b* of the coil spring 52 forming a second spring member of the spring mechanism 50. Through this formation, the flat-type supporting member 60 is biased backwards by the spring mechanism 50 in a normal state. Incidentally, between the side frame members 21, 21 and side edge portions of the flat-type supporting member 60, as shown in FIG. 2, respective one piece of auxiliary coil springs 26 are put over. The auxiliary coil springs 26 are disposed supplementaliry to make up a feeling of stroke on the side edge portions of the flat-type supporting member 60. As the flat-type supporting member 60, Plumaflex, a two-dimensional net member (cloth spring), a solid knitted fabric (three dimensional net member) or the like can be used. A cloth formed from, for instance, either one of the warp or weft including elastic yarn such as a plyester elastomer fiber, a polyurethane fiber, or the like, and the other of the warp or weft including common yarn such as nylon fibers, polyester fibers or the like which is smaller in elasticity than that of elastic yarn can be used as a two-dimensional net member. As the solid knitted fabric (three-dimensional net member), a solid knitted fabric formed by using a Double Raschel knitting machine or the like, and knitted by reciprocating connecting yarn between a pair of ground knitted fabrics positioned at a predetermined interval can be used.

Figure 5A:
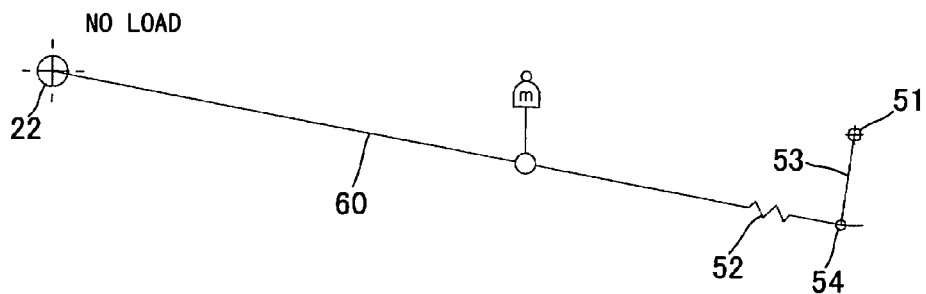
FIG. 5A, FIG. 5B, and FIG. 5C are views to explain the function of the above-described embodiment.
Figure 5B:
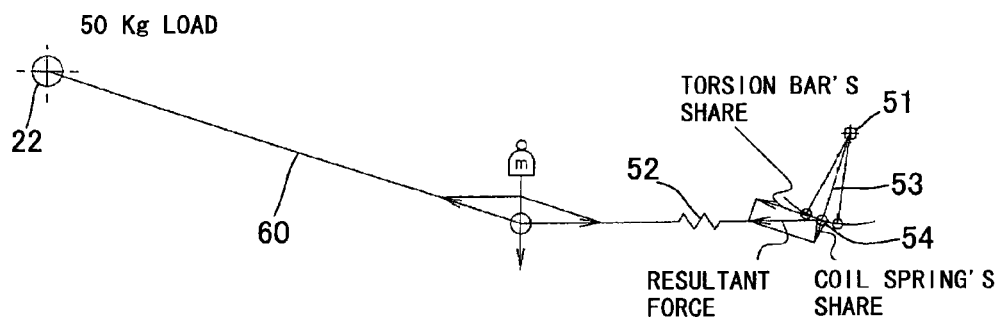
Figure 5C:
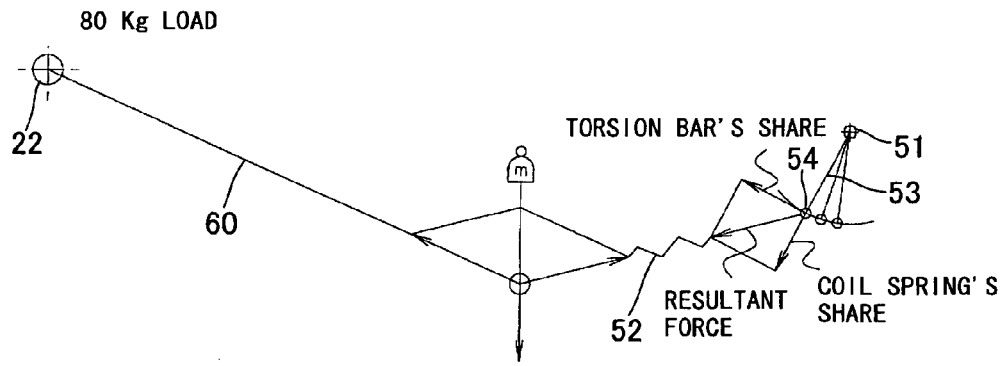

In the torsion bar 51 being the first spring member and the coil spring 52 being the second spring member, both forming the spring mechanism 50, the spring constant of the torsion bar 51 is set to be lower than the spring constant of the coil spring 52. It should be noted that since a plurality of the coil springs 52 are disposed, a so-called spring constant of the coil springs 52 here is a composite spring constant of the plural coil springs 52 disposed in parallel. As a result, when a person takes a seat on the cushioning member 25, the torsion bar 51 being relatively low in spring constant starts working, the coil springs 52 do not expand nor contract before reaching a predetermined load value, and only the angle of disposition varies as the flat-type supporting member 60 descends along with seating of a person. Then, when exceeding the predetermined load value, the coil springs 52 start to expand, and when vibration is inputted, two spring members of the torsion bar 51 and the coil spring 52 connected in series work together. For instance, as shown diagrammatically in FIGS. 5A, 5B, and 5C, from a state at the time of no load in FIG. 5A till, for instance, a load of 50 kg, most loads are shared by the torsion bar 51 (FIG. 5B), and the coil spring 52 changes only the angle of disposition. When a load of 80 kg in weight is given, the coil springs 52 become large in their share of the load (FIG. 5C), and work together with the torsion bar 51.

That is, when a spring constant of the torsion bar 51 being the first spring member is supposed to be k1, and a spring constant of the coil springs 52 (composite spring constant of a plurality of coil springs 52 disposed in parallel) being the second spring member is supposed to be k2, a composite spring constant k equals to k1×k2/(k1+k2) when they are connected in series, becomes smaller than the spring constant k1 of the torsion bar alone, and approaches a spring constant 0 (zero). A preferable composite spring constant k is in the range of 0<k≦20 N/mm.

More preferably, the torsion bar 51 being the first spring member is in the range of 1 to 20 N/mm in spring constant, and the coil springs 52 being the second spring member have a higher spring constant than the spring constant of the torsion bar 51, and is in the range of 1 to 67 N/mm in a spring constant (a composite spring constant of a plurality of coil springs 52 disposed in parallel). Then, a structure to make the torsion bar 51 mainly work till reaching a statically equilibrium state of a seated person in the range of 40 kg to 80 kg in weight, which covers the weight of most adults (in the range of about 30 kg to about 70 kg in terms of added load to the cushioning member 25) can be formed. As a result that a spring constant of the torsion bar 51 and a spring constant of the coil springs 52 (a composite spring constant of a plurality of coil springs 52 disposed in parallel) are set in the above-described range, more preferable composite spring constant k when the torsion bar 51 and the coil springs 52 are connected in series as in the present embodiment is in the range of 0<k≦15.4 N/mm. Note that the value of the spring constant of the above-described torsion bar 51 is a value obtained by measuring the amount of displacement of the flat-type supporting member 60 when the rear end 62 of the flat-type supporting member 60 is directly connected to the supporting frame 54 supported by the torsion bar 51 without through the coil springs 52 to apply the load to the flat-type supporting member 60.

The cushioning member 25 strained over the cushion frame 20 is engaged with the front frame member 22 at the front edge of the cushioning member 25 in the upper position of the above-described flat-type supporting member 60, and is strained at a low tension of 0 to 5% in elongation percentage so as to be put over between the side frames 21 and 21. The cushioning member 35 strained over the back frame 30 is disposed at a low tension of 0 to 5% in elongation percentage to cover the upper frame member 32 and at the same time to be put over between the side frames 31 and 31.

Respective cushioning members 25 and 35 are disposed as a tension structure by strained over the cushion frame 20 or the back frame 30 as described above to be provided with a cushioning function using tension. Therefore, it is possible to use a thinly-made material. For instance, a material made by laminating a surface member made of a two-dimensional net member or the like on a thin urethane member of about 5 to about 20 mm in thickness can be used. However, it is preferable to use the above-described solid knitted fabric (a three-dimensional net member) which is excellent in cushionability though it is thin.

In any case, it is preferable to provide in such a manner that its load-to-deflection characteristic in substantially vertical direction is similar to the load-to-deflection characteristic of the muscle of a human body by providing as a tension structure at low tension of 0 to 5% in elongation percentage. Through this structure, the respective cushioning members 25 and 35 work as a pseudo-muscle. Therefore, a subcutaneous vein is to be placed between an actual muscle in the skin and a pseudo-muscle (cushioning members 25 and 35) contacting through the skin. That is, when the cushioning members 25 and 35 have no characteristic to be seen as a pseudo-muscle as is in the above manner, and are too hard or, conversely, too soft compared with the spring characteristic of the muscle, they press the vein by their share force. However, when the cushioning members 25 and 35 have a spring characteristic able to be seen as a pseudo-muscle, since the vein is sandwiched between the actual muscle and the pseudo-muscle, the pressure onto the vein is reduced. And when the cushioning members 25 and 35 which can be seen as a pseudo-muscle are vibrated at a low frequency, it becomes under a similar condition to the case of massaging the muscle of a human body at a low frequency to promote the circulation of the blood, so that the similar effect can be given. Therefore, when the cushioning member 25 for seat cushion is disposed above the flat-type supporting member 60, the acceleration of vibration imputted from the floor of a vehicle body by the above-described spring mechanism 50 provided with a low composite spring constant becomes small. Especially, since a high frequency component is eliminated efficiently, the subcutaneous vein between the cushioning member 25 for seat cushion and the muscle of the femoral region is excited (preferably 1/f excitation) by vibration at a low frequency. In other words, the low frequency vibration seat 10 of the present embodiment has a structure to be able to affect a pumping function similar to the function called a muscular pump to carry blood to the heart by contraction of the muscle to the subcutaneous vein not surrounded with the muscle by the cushioning member 25 for seat cushion which can be seen as a pseudo-muscle due to the above-described structure set on the seat 10, and has a function to be able to call a seat pump taken from the terms of a muscle pump.

Figure 6:
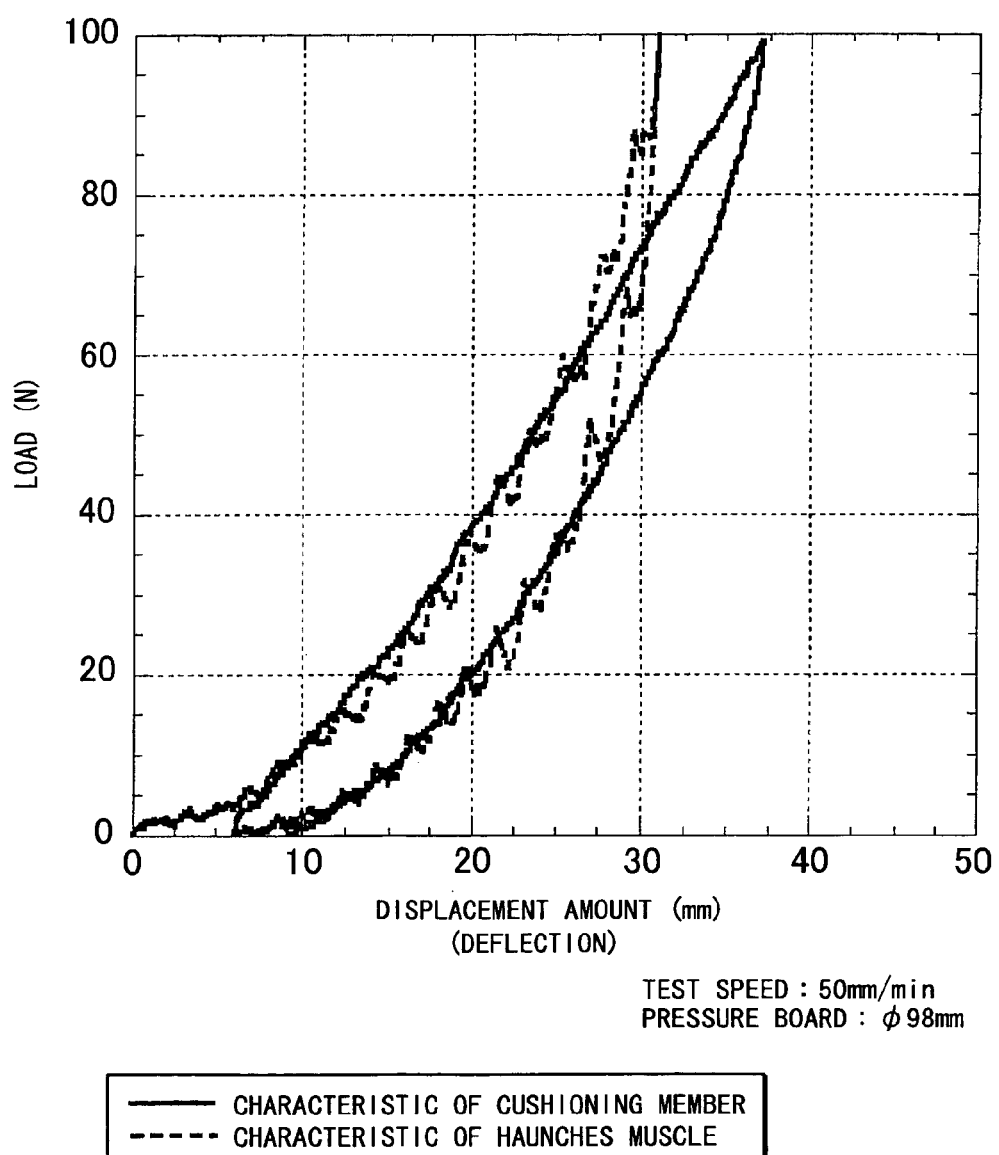
FIG. 6 is a view showing an example of a load-to-deflection characteristic of the haunches muscle of a human body and that of a cushioning member.

FIG. 6 shows an example of a load-to-deflection characteristic of the muscle of human haunches. As shown in the drawing, the load-to-deflection characteristic of the muscle of human haunches has a slightly nonlinear tendency, and when applying pressure up to 100 N with a pressure board of 98 mm in diameter, it is in the range of 0.5 to 8 N/mm in the weight applying process, and in the range of 0.1 to 12 N/mm in the weight removing process. The amount of hysteresis loss is about 30 N at maximum. Accordingly, when pressure is applied to the cushioning member 25 for seat cushion and the cushioning member 35 for seat back with a pressure board of 98 mm in diameter up to 100 N, considering differences among individuals, it is preferable to set to be in the range of 0.3 to 10 N/mm in the weight applying process, and in the range of 0.1 to 15 N/mm in the weight removing process, and the amount of hysteresis loss between the weight applying process and the weight removing process to be 10 to 200N, more preferably 10 to 30 N. Then, it becomes possible to have a load-to-deflection characteristic similar to the load-to-deflection characteristic of the muscles of human haunches.

Incidentally, numeral 70 in FIG. 1 and FIG. 2 is a pelvis supporting member disposed on a position corresponding to the rear of the pelvis of a seated person, connected to the above-described torsion bar 51, and biased to protrude forward at the upper edge at a normal state. This is designed to prevent slack of the cushioning member 35 for seat back at the time of no load to improve the outside appearance, and to exhibit a function to guide in the following manner that when a big impact is given due to collision or the like, so that the upper edge is fallen down backwards pressed by the pelvis of a seated person whereby the seated person is pushed to the cushioning member 35 for seat back.

TEST EXAMPLE 1

Using the low frequency vibration seat 10 (example 1) shown in FIG. 1 to FIG. 4, a load is applied to the seat cushion 12 up to 1000 N, to measure the load-to-deflection characteristic. A spring constant of a torsion bar 51 used for the test was 5 N/mm. 6 pieces of the coil springs 52 arranged in parallel were used and the spring constant per one piece was 1.5 N/mm, and the composite spring constant of the plural coil springs 52 was 9 N/mm. Accordingly, a composite spring constant when torsion bar 51 and the plural coil springs 52 were connected in series was 3.2 N/mm.

Figure 7:
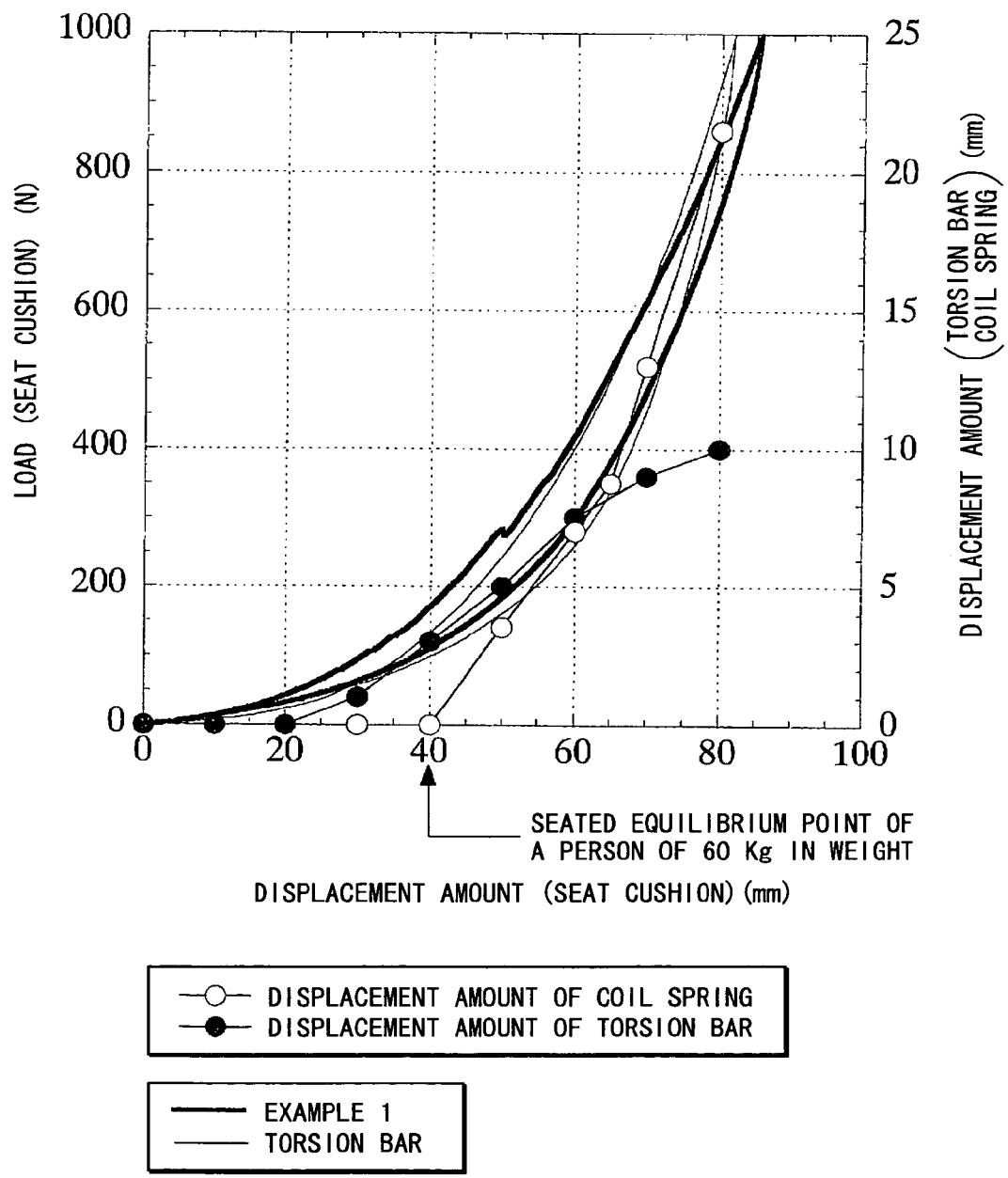
FIG. 7 is a view showing a load-to-deflection characteristic of a seat cushion of a low frequency vibration seat in an example 1, and the amount of displacement of a torsion bar and a coil spring.
Figure 8:
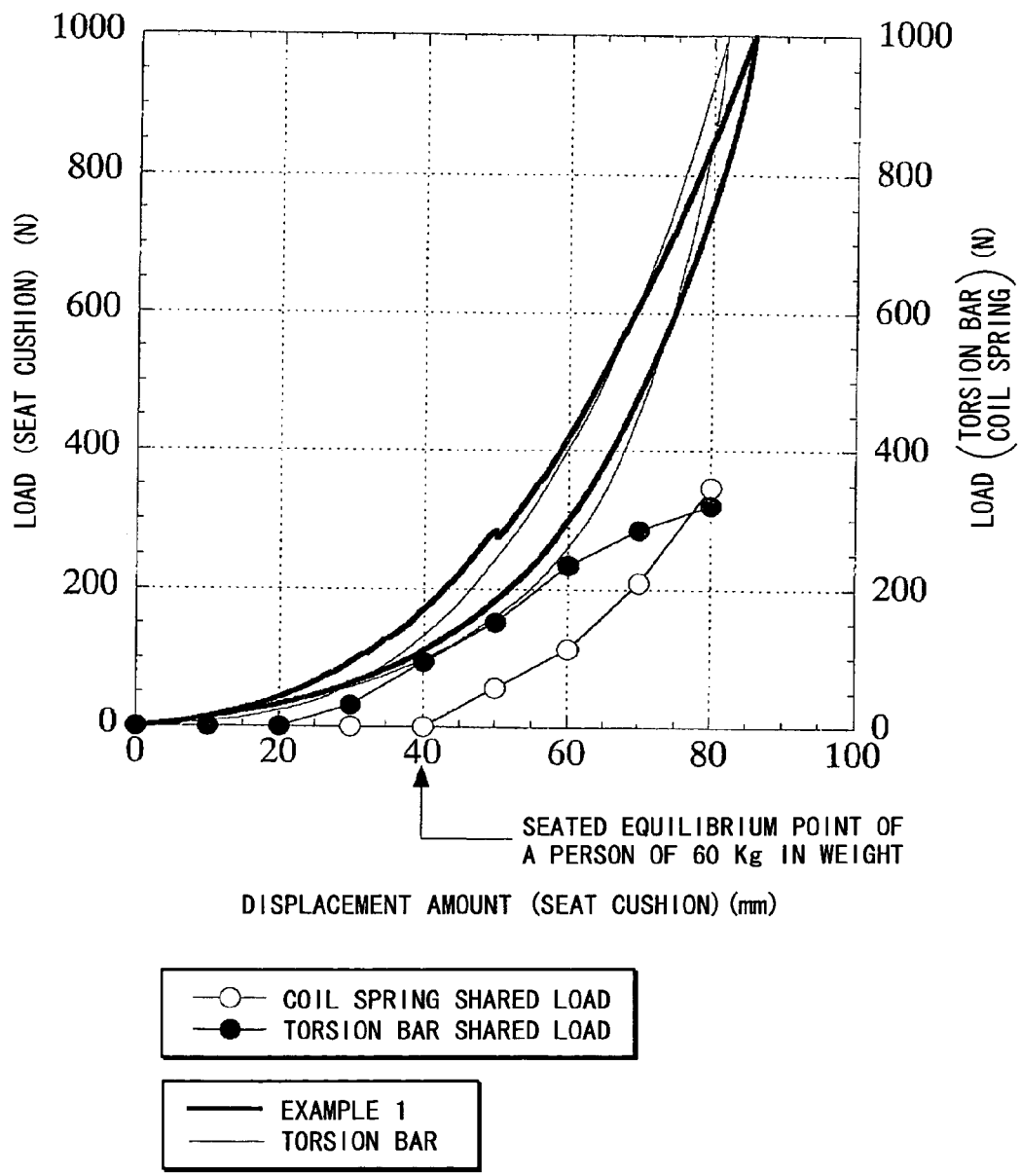
FIG. 8 is a view showing the load-to-deflection characteristic of the seat cushion of the low frequency vibration seat in example 1, and the shared load of the torsion bar and the coil spring.

As the flat-type supporting member 60, a cloth spring knitted with polyester elastomer fiber and nylon fiber. Both the cushioning member 25 for seat cushion and the cushioning member 35 for seat back use a solid knitted fabric and are strained over the cushion frame 20 and the back frame 30 at an elongation percentage of 0%. Incidentally, the solid knitted fabric used for the test was knitted under the following manufacturing condition, and provided with a characteristic shown by a solid line in FIG. 6 as a load-todeflection characteristic when strained separately at an elongation percentage of 0%. The test result is shown in FIG. 7 and FIG. 8.

kitting machine: Double Raschel knitting machine (9 gauge/2.54 cm, distance between shuttles 15 mm)

wale density: 10 piece/2.54 cm course density: 14 piece/2.54 cm finished thickness (distance between the surfaces of a pair of ground knitted fabrics): 11.5 mm ground yarn for one ground knitted fabric: 1170 decitex/96f polyester-BCF multifilament (crimp-finished yarn)

ground yarn for the other ground knitted fabric: 660 decitex/192f polyester-BCF multifilament (crimp-finished yarn)

connecting yarn: 660 decitex/1f polyester structure of one ground knitted fabric: modified structure of 2 course mesh structure of the other ground knitted fabric: queens cord total thickness of a stitch formed with ground yarn of one ground knitted fabric and connecting yarn: 1830 decitex (partially 3000 decitex)

total thickness of a stitch formed with ground yarn of the other ground knitted fabric and connecting yarn: 1980 decitex FIG. 7 shows a chart by assuming amounts of displacement (amounts of deflection) of the seat cushion on the horizontal axis, load values given to the seat cushion on the left side of the vertical axis, and respective amounts of displacement of the torsion bar 51 and the coil spring 52 on the right of the vertical axis. Incidentally, the amount of displacement of the torsion bar 51 is shown by the amount of displacement of the supporting frame 54 supportedly connected to an arm 53. FIG. 8 assumes amounts of displacement (amounts of deflection) of the seat cushion on the horizontal axis, and at the same time load values given to the seat cushion on the left side of the vertical axis similarly to FIG. 7, and respective share loads of the torsion bar 51 and the coil spring 52 on the right of the vertical axis.

First, as is clear from FIG. 7, only the cushioning member 25 for seat cushion displaces until the amount of displacement of the seat cushion comes to 20 mm, and the torsion bar 51 starts to displace when the amount of displacement of the seat cushion exceeds 20 mm to start working its spring characteristic. The torsion bar 51 keeps the displacement almost linearly. On the other hand, the coil spring 52 does not start functioning until the amount of displacement of the seat cushion reaches 40 mm which corresponds to the equilibrium point in a statically seated state of a person of 60 kg in weight. When the amount of displacement of the cushioning member 25 for seat cushion exceeds 40 mm, the coil spring 52 starts functioning and displaces almost linearly. Accordingly, as shown in FIG. 8, the load is shared only by the torsion bar 51 until the amount of displacement of the seat cushion reaches 40 mm, in other words, until the equilibrium point in a statically seated state of a person of 60 kg in weight. At the time of exceeding 40 mm, the coil spring 52 starts to share the load, and from that time on, two spring members of the torsion bar 51 and the coil spring 52 support the load.

FIG. 7 and FIG. 8 show the whole load-to-deflection characteristic (broad solid line) of the seat cushion 12 in example 1 and load-to-deflection characteristic (thin solid line) of the torsion bar 51 alone. As is clear from the drawing, in the case of example 1, until the amount of displacement reaches the equilibrium point in a statically seated state of a person of 60 kg in weight, only a spring characteristic in which the spring constant of the cushioning member 25 for seat cushion is added to the spring constant of the torsion bar 51 functions, but when exceeding the equilibrium point in a statically seated state, the spring constant of the coil spring 52 directly connected to the torsion bar 51 is superimposed, the load is supported by the composite spring constant of both springs. Accordingly, the whole spring constant obtained from the load-to-deflection characteristic of the whole seat cushion 12 in test example 1 becomes smaller than the spring constant of the torsion bar 51 alone.

TEST EXAMPLE 2

Figure 9:
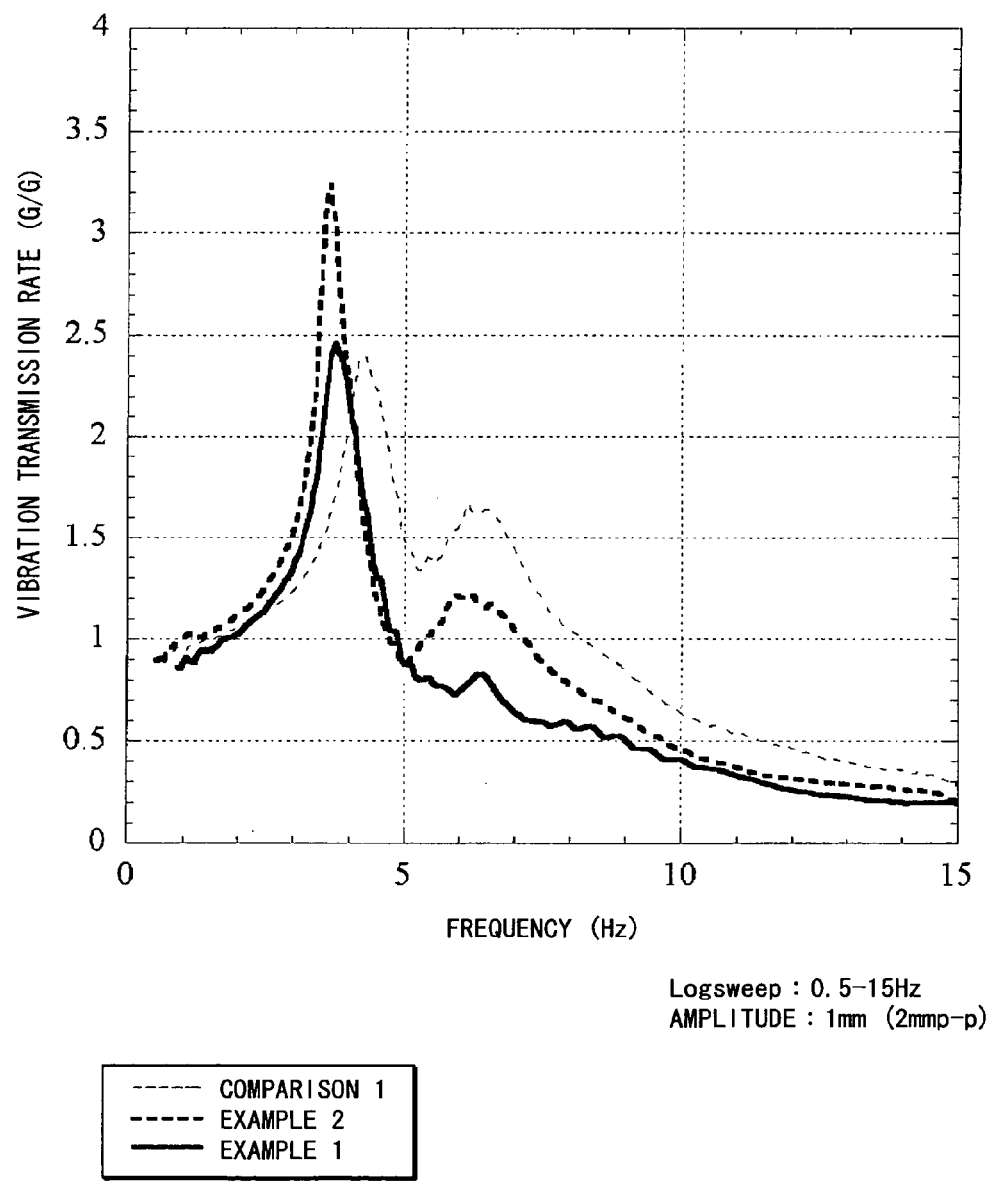
FIG. 9 is a view showing vibration transmission rates of respective seats in example 1, example 2 and comparison 1.

A person of 60 kg in weight takes a seat on the low frequency vibration seat 10 used in test example 1 (example 1) and is vibrated vertically with a random wave having single-sided amplitude of 1 mm (amplitude between peaks: 2 mm) and a frequency of 0.5 Hz to 15 Hz by a vibrator to measure a vibration transmission rate to the surface of the cushioning member 25 for seat cushion. Next, as the cushioning member 25 for seat cushion, instead of the solid knitted fabric having a characteristic shown in FIG. 6, a solid knitted fabric having a spring constant both in a weight applying process and in a weight removing process about 5 to about 10 N/mm higher is strained above the low frequency vibration seat 10 in example 1 to measure a vibration transmission rate by vibrating under the same condition (example 2). For comparison, the same person takes a seat on a seat structure of the same structure as that in example 2 except that the rear edge 62 of the flat-type supporting member 60 is directly connected to the supporting frame 54 of the torsion bar 51 with no disposition of the coil spring 52, and a vibration transmission rate is measured in the same manner as that in example 2 (comparison 1). The result is shown in FIG. 9. Note that a bold solid line shows data in example 1, a bold broken line data in example 2, and a thin solid line data in comparison 1.

As is clear from FIG. 9, when compared between example 2 and comparison 1 first, the peak of resonance of example 2 shifts to a lower frequency region, and the vibration transmission rate above 4 Hz in example 2 is smaller than that in comparison 1. In other words, it is found that a composite spring constant can be made small, especially a vibration transmission rate in the high frequency region can be reduced by serially connecting two spring members as the spring mechanism 50 as in example 2. As a result, the vibration transmitted on the surface of the cushioning member 25 for seat cushion is mainly composed of a low frequency component, resonates with a living body reaction by heartbeat or breathing of a human, enhances the function in a peripheral circulation system, and improves seating comfort (riding comfort).

Further, as in this manner, even by supporting a flat-type supporting member using a spring mechanism low in spring constant, low frequency vibration can be excited on the surface of the cushioning member. However, when a cushioning member more closely analogous to the muscle characteristic is used as in example 1, the vibration transmission rate becomes further lower as compared with example 2, and it is found that it can give vibration more closely analogous to 1/f fluctuation.

TEST EXAMPLE 3

Next, a plate for measuring displacement is mounted on the cushioning member 25 for seat cushion of the low frequency vibration seat 10 in example 1, and on the plate for measuring displacement, a sheet of a solid knitted fabric having a pseudo-muscle characteristic as above is mounted, and further a weight of 6.7 kg is mounted on it to measure the fluctuation characteristic of the surface of the cushioning member 25 for seat cushion. Since the solid knitted fabric is to be seen as a pseudo-muscle, the combination of the solid knitted fabric and the weight corresponds to a person who takes a seat on the cushioning member 25 for seat cushion. Such a low frequency vibration seat 10 is mounted on a vibrator, and random wave vibration is vertically given under the same vibration condition as in the test example 2. Further, measurement is made for respective cases of setting the weight at the position 100 mm in front of the hip point, at the position 150 mm in front, and at the position 200 mm in front.

Figure 10A:
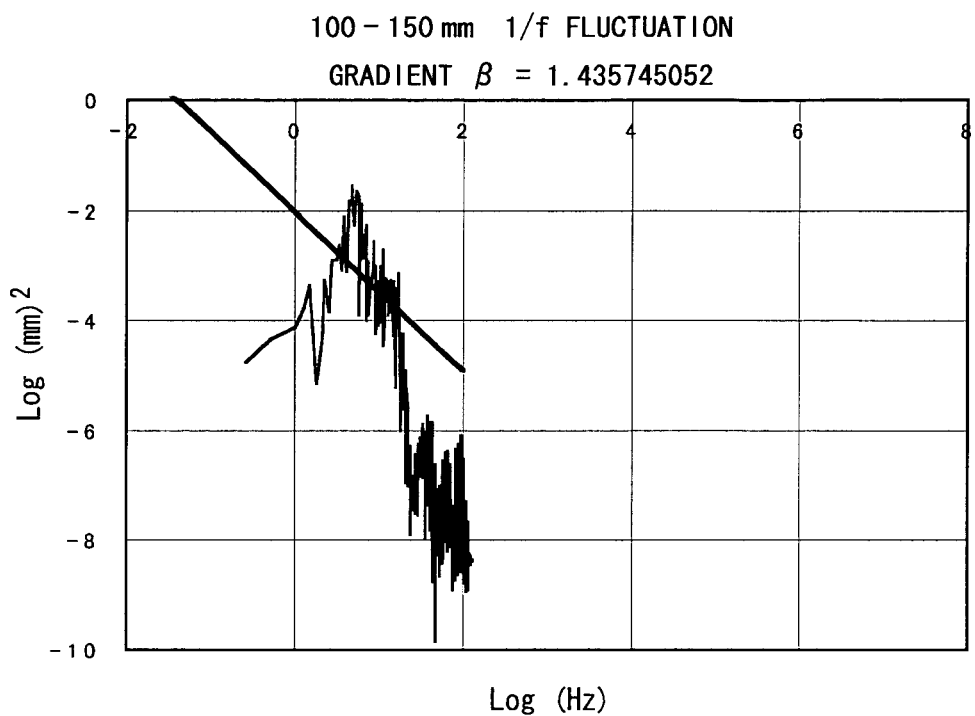
FIG. 10A and FIG. 10B are views analyzing whether 1/f fluctuation is generated in the low frequency vibration seat in example 1.
Figure 10B:
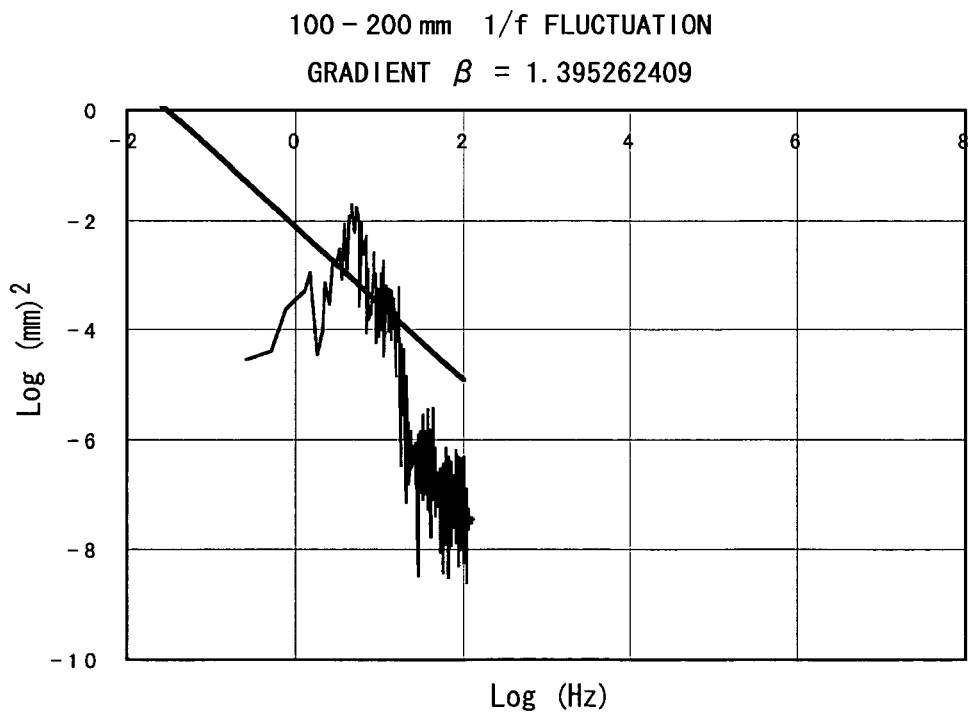

Concretely, each displacement is measured at a sampling frequency of 100 Hz by a laser displacement meter, and respective-relative displacement (x) with displacement on a position of 150 mm and displacement on a position of 200 mm to displacement on a position of 100 mm are calculated. Next, a time history of the relative displacement is taken to be $t_n = X_n$ ($_n$ means the number of sampling), a wave form shifted by (10 point)×(1/100 Hz) sec is defined as $t_{n+10} = x_{n+10}$, and that $x_n$ plotted on the x-axis, and $x_{n+1}$ plotted on the y-axis is defined to as an attractor. This attractor is FTT analyzed, and the relation between both is expressed on a logarithm axis with (y=attractor [mm], x: [Hz]), y: log (attractor)$^2$, x: log (Hz) to find a gradient β. When this gradient β is 1.5 or less, 1/f fluctuation is generated. The result is shown in FIGS. 10A, 10B and FIGS. 11A, 11B. FIG. 10A and FIG. 10B show data in example 1, and FIG. 11A and FIG. 11B shows data in comparison 1. FIG. 10A and FIG. 11A show fluctuation characteristics for a position of 150 mm to a position of 100 mm in front of the hip point, and FIG. 10B and FIG. 11B similarly show fluctuation characteristics for a position of 200 mm to a position of 100 mm in front of the hip point.

Gradients of the graphs found from these drawings are, gradient β=1.3211134857 in FIG. 10A, gradient β=1.435745052 in FIG. 10B, gradient β=3.211134857 in FIG. 11A, gradient β=4.101897179 in FIG. 11B. Accordingly, in the case of a seat in example 1 in FIGS. 10A and 10B, while 1/f fluctuation excitation is generated on the surface (contacting face with a human body) of the cushioning member for seat cushion, it becomes clear that 1/f fluctuation excitation is not generated in the case of comparison 1.

In the above-described test example 3, an acceleration pick up is mounted on a weight, $$\text{Load} = \frac{\text{Acceleration}}{9.8 \text{ m/s}^2} \times \text{Weight of the weight}$$

is taken as a load from the above-equation and at the same time, relative displacement between displacement of a plate for displacement measurement and displacement of vibrator is found, to prepare a Lissajous figure for a relation between load and relative displacement. FIG. 12 is a Lissajous figure of example 1, and FIG. 13 is a Lissajous figure of comparison 1. In the Lissajous figure, a portion of high line density shows a position of an equilibrium point with a human body. In case of FIG. 12, it is found that the equilibrium position is obtained at two points (the equilibrium points A and B in the drawing). On the other hand, in the case of FIG. 13, the position of equilibrium point is one point (the equilibrium point C in the drawing). That is, while in the case of example 1, a human body is supported against inputted vibration at a plurality of equilibrium points A and B, in the case of comparison 1, a human body is supported at one position of the equilibrium point C. In other words, while in the case of example 1, by shifting to a plurality of equilibrium points A and B, body movement is prompted and it becomes possible to prompt change of posture so as to circulate between posture in one equilibrium point A and posture in the other equilibrium point B without being substantially fixed, in the case of comparison 1, it can be said that it is a structure difficult to generate such a circulating function of posture. Accordingly, in the case of example 1, the bloodstream is prompted by such a circulating function of posture, movement of intervertebral disk is helped together with a seat pumping function analogous to the muscle pumping function and 1/f excitation function, so that it is found to be extremely suitable to enhance the function of peripheral circulation system.

It should be noted that the present invention is not limited to the above embodiments. In the above embodiments, a structure provided with a spring mechanism composed of two spring members connected in series is used as a vibration control section. What is explained in the above-described embodiment is superior in that it can generate low frequency vibration (1/f fluctuation) to a cushioning member with a very simple structure at low cost, and preferable for practical use. However, the present invention is sufficient if it can give low frequency vibration, preferably 1/f fluctuation to a cushioning member disposed at a contacting portion with a human body. As a vibration control section, other mechanism can be used, and at least in a predetermined displacement range, a member having a load to deflection characteristic in which load scarcely increases with increase of amount of displacement, in terms of spring constant k, a member having a spring mechanism provided with a region in the range of 0<k≦20 N/mm or less are acceptable.

Figure 14:
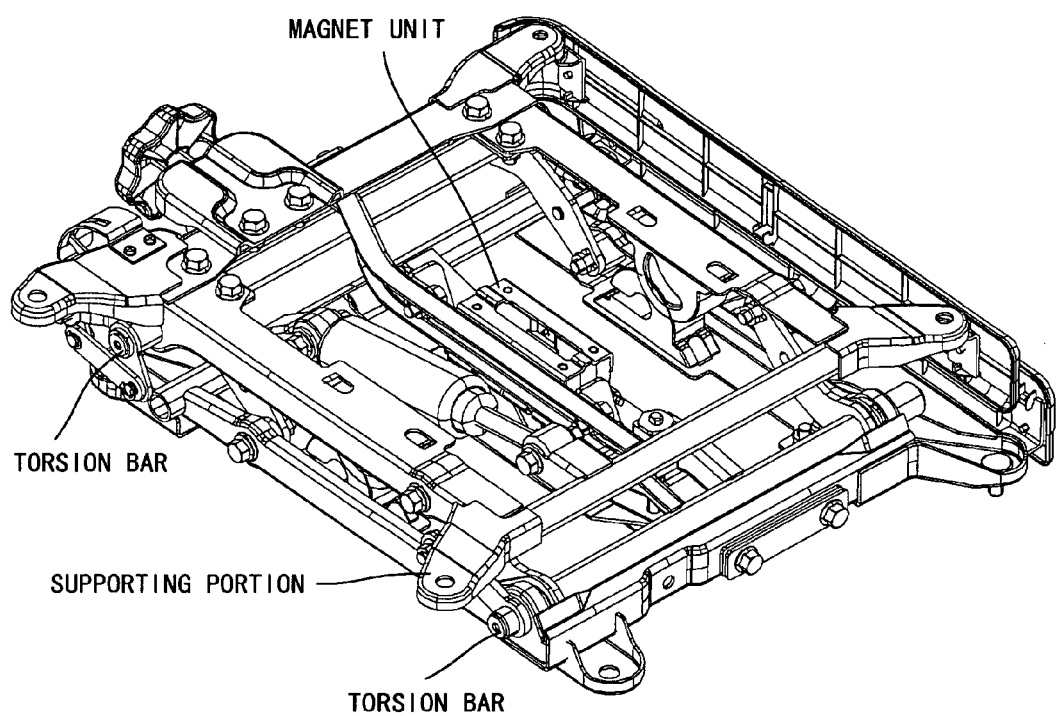
FIG. 14 is a view showing one example of a seat suspension as other spring mechanisms forming a vibration control section.

For instance, such a spring mechanism as shown in FIG. 14 can be used. The spring mechanism shown in FIG. 14 is applied as a seat suspension. The mechanism is used by connectedly supporting a cushion frame for a seat at the supporting portion, and composed of a magnetic spring (magnet unit) having a load to deflection characteristic, in which at least in a predetermined range of displacement, a load value decreases as increase of displacement amount, and a torsion bar as an elastic member having a load-to-deflection characteristic in which in the above predetermined range of displacement, a load value increases as increase of displacement amount. That is, as a magnetic spring (magnet unit), a spring, having a negative spring constant, in which a load value decreases as increase of displacement amount in a predetermined range of displacement, is used, for instance, disclosed in such as Japanese Patent Application Laid-open No. 2002-206594 proposed by the present inventor. By combining a torsion bar having a positive spring constant in the same displacement range as described above to the spring described above, the spring constant superimposed on one with the other is set to be substantially 0 (zero).

Therefore, when the spring mechanism (seat suspension) connectedly supporting the cushion frame at a supporting portion of the spring mechanism is used, since the spring constant is extremely low similarly to the above-described embodiment, a high frequency component coming from the floor of a vehicle body is reduced, and low frequency vibration, preferably 1/f fluctuation can be arisen on a cushioning member. It should be noted that as such a seat suspension, that disclosed in Japanese Patent Application Laid-open No. 2001-59546 proposed by the present inventor can be also used. It is also possible to make a structure to support a seat provided with a spring mechanism connected in series shown in the above-described embodiment, in other words, to make a structure be provided with two spring mechanisms as a vibration control section as compared to the spring mechanism (seat suspension) shown in FIG. 14. Further, it is also possible to make a structure not only to cut a high frequency component by using this kind of spring mechanism, but also to incorporate a vibrator to arise low frequency vibration (1/f fluctuation) more securely to a cushioning member, as a vibration control section.

A low frequency vibration structure of the present invention is applicable not only to a seat structure (low frequency vibration seat) for transportation machine such as a motor car, but also applicable to a seat structure for home use, office use, or for bedding, and in that case, since there is no vibration coming from below the seat like the seat structure for transportation machine, a vibrator is connected to a cushion frame and/or back frame, so as to make a structure to arise low frequency vibration, preferably 1/f fluctuation excitation on a contacting surface with a human body in a cushioning member.

Figure 15:
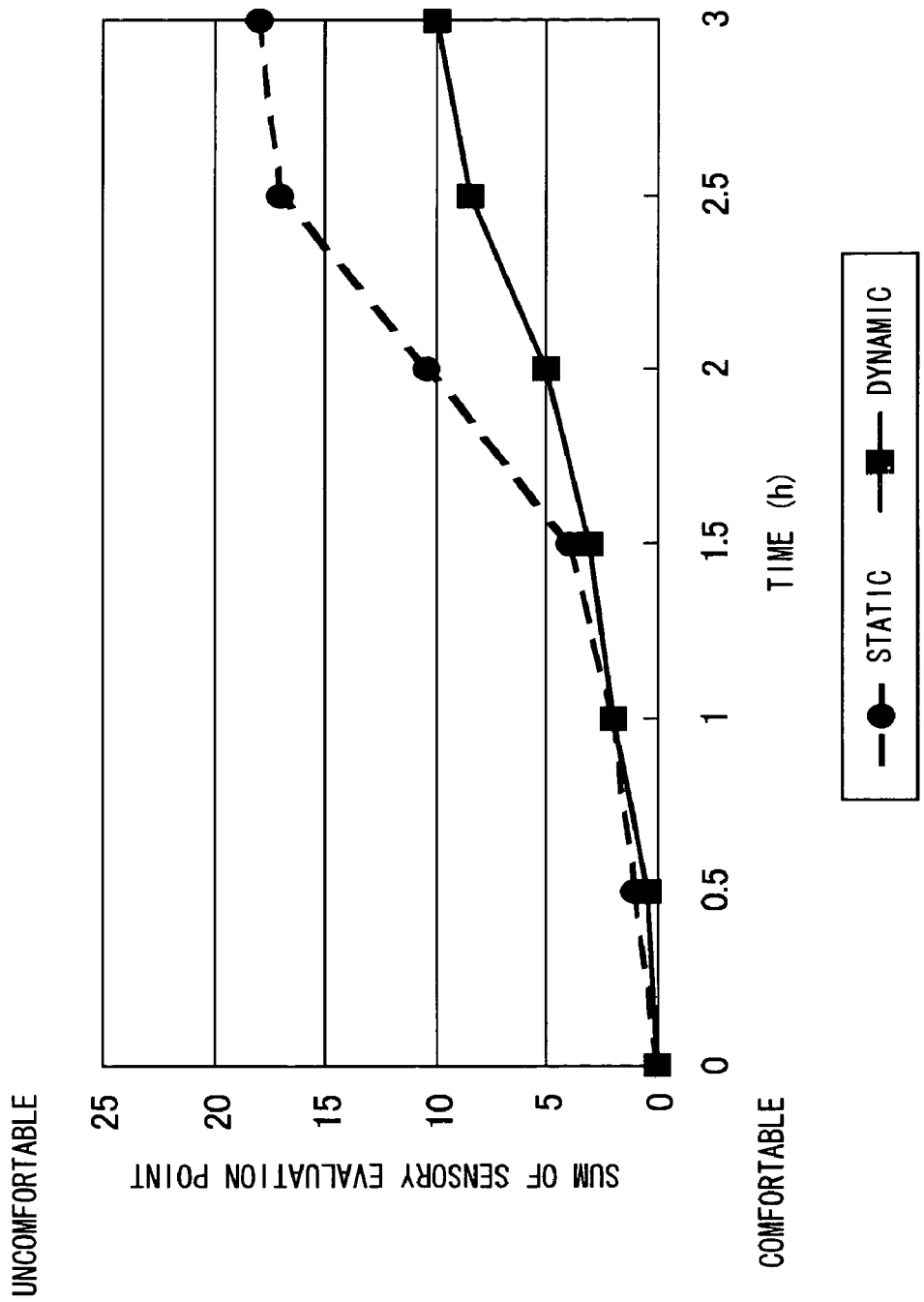
FIG. 15 is a view showing a result of a sensual evaluation about long hour seating of the seat in example 1.

FIG. 15 shows a result of sensory evaluation when being seated on a seat (statically) for a long hour (3 hours) without vibrating a seat in example 1 mounted on a floor, and when being seated on a seat (dynamically) for a long time (3 hours) applying vertical vibration by supportedly connecting the cushion frame of the seat to a vibrator. It should be noted that vertical vibration applied by a vibrator is random vibration just the same as the condition of vibration in test example 2, and 1/f fluctuation excitation is generated on the surface of the cushioning member for seat cushion in the same manner as described above. The sensory evaluation is performed according to Borg's index, based on a research report ("Seat Sensory Quality Evaluation, Inagaki Dai et al. A Corporate Juridical Person, Society of Automotive Engineers of Japan, Academic Lecture Meeting Preprint Collection No. 91–99, Page 21 to 24, (2002)) saying that change in electrical potential of muscle in bodily fatigue has coincided with a tendency evaluated by the Borg's index, which is sensory evaluation of muscle fatigue. The test is carried out with two subjects, and the result is expressed with the average value of the results obtained by the two subjects. The higher the value becomes, the worse the result is, and the lower the value becomes, the better the result is.

As is clear from FIG. 15, there is no significant difference between both during 1.5 hours after starting the test. However, a big difference arises after 1.5 hours, which shows that the case under the dynamic condition with the vertical vibration brings less fatigue due to being seated for a long time. Accordingly, in the case of a seat for home use or office use, it becomes possible to reduce fatigue due to being seated for a long time by taking a structure to positively generate 1/f fluctuation on the surface of a cushioning member by connecting to a vibrator which gives vibration as described above. When applied to a bedding, since 1/f fluctuation is generated on the surface of a cushioning member contacting with a human body, the entire body is exposed to the 1/f fluctuation due to lying on one's back or lying on one's side, resonates with a living body reaction, so that the seat for a bedding applying the present invention can induce a person on the bed to sleep quickly.

A low frequency vibration structure and a low frequency vibration seat can vibrate the surface of a cushioning member, which is a contacting surface with a human body, produce a change as if posture circulate without substantially being fixed due to excitation analogous to a body reaction of a human body, though a static state is kept from a sense of a human itself, so that movement of the intervertebral disk and the peripheral circulation system can be kept favorably. Especially, when a member analogous to spring characteristic of the muscle of a human body is used as a cushioning member, the circulation effect of posture is easily created by the excitation closely analogous to a living body reaction, and is further able to make the seat generate a pumping function closely analogous to the muscle pump so as to prompt effectively the circulation of the blood in the subcutaneous vein not surrounded by the muscle.

What is claimed is:

1. A low frequency vibration seat, comprising:
 a cushioning member disposed at a contacting portion with a human body;
 a vibration control section formed with a spring mechanism, of which spring constant k is set to be $0<k\leqq20$ N/mm in at least a predetermined displacement range to make a low frequency vibration arise in said cushioning member; and
 a flat-type supporting member, connected to said spring mechanism at the rear end thereof, and supported to a frame member positioned in front of a cushion frame at the front end thereof, and biased backwards by said spring mechanism, and disposed under said cushioning member;
 wherein the spring mechanism forming said vibration control section is formed by serially connecting a plurality of spring members different in spring constant, and disposed in the rear of the seat cushion;
 among the spring members forming said spring mechanism, a spring member relatively low in spring constant mainly works until a statically equilibrium state is obtained after a person takes a seat on said cushioning member; and
 when vibration is inputted, the plurality of spring members connected in series work together, the composite spring constant of the spring members has a lower value than that of said spring member relatively low in spring constant, the composite spring constant has a value in the range of $0<k\leqq20$ N/mm in at least a predetermined displacement range.

2. The low frequency vibration seat according to claim 1, wherein said plurality of spring members comprise: a first spring member connected to either frame member forming a cushion frame or a back frame positioned in the rear of the seat cushion at one end; and
 a second spring member connected to said first spring member directly or indirectly at one end, and connected to the rear end of said flat-type supporting member at the other end,
 said first spring member has a relatively lower spring constant than that of said second spring member.

3. The low frequency vibration seat according to claim 2, wherein said first spring member comprises a torsion bar connected to the frame member at one end and disposed along the width direction of the seat cushion, said second spring member is composed of a plurality of coil springs, said respective coil springs are connected at each one end in parallel to a supporting frame supportedly connected to an arm which is connected to said torsion bar at the base end portion and biased or urged backwards, and disposed along the width direction of the seat cushion.

4. The low frequency vibration seat according to claim 1, wherein said cushioning member includes a spring constant calculated from the load-to-deflection characteristic when pressurized up to 100 N with a pressure board of 98 mm in diameter is 1.5 to 3.5 N/mm at a weight applying process, 1 to 3 N/mm at a weight removing process, and the amount of hysteresis loss between the weight applying process and the weight removing process is in a range of 10 to 30 N at the maximum.

5. The low frequency vibration seat according to claim 1, wherein said vibration control section includes in addition to said spring mechanism formed by serially connecting spring members different in spring constant, and disposed in the rear of the seat cushion, other spring mechanism composed of a combination of a magnetic spring having a load-to-deflection characteristic in which the load value decreases with increase of the amount of displacement in at least a predetermined displacement range, and a torsion bar having a load-to-deflection characteristic in which the load value increases with increase of the amount of displacement in the predetermined displacement range, the other spring mechanism supports the seat cushion so as to be used as a seat suspension.

6. The low frequency vibration seat according to claims 1, wherein said vibration control section further comprises a vibrator for vibrating the above described spring mechanism at a low frequency, and the spring mechanism is supportedly connected to the vibrator.

* * * * *